United States Patent
Murakami et al.

(10) Patent No.: US 6,870,336 B2
(45) Date of Patent: Mar. 22, 2005

(54) VEHICLE DRIVING APPARATUS

(75) Inventors: Hiroshi Murakami, Saitama (JP); Naoki Imai, Saitama (JP); Morio Kayano, Saitama (JP); Tomohiko Maeada, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 75 days.

(21) Appl. No.: 10/381,782

(22) PCT Filed: Aug. 27, 2002

(86) PCT No.: PCT/JP02/08611

§ 371 (c)(1),
(2), (4) Date: Mar. 28, 2003

(87) PCT Pub. No.: WO03/031219

PCT Pub. Date: Apr. 17, 2003

(65) Prior Publication Data

US 2003/0169001 A1 Sep. 11, 2003

(30) Foreign Application Priority Data

Sep. 10, 2001 (JP) .................................. 2001-274145

(51) Int. Cl.[7] .................................................. H02P 7/00
(52) U.S. Cl. .................... 318/432; 318/139; 318/434; 318/440; 318/798; 318/800
(58) Field of Search ............................... 318/139, 440, 318/430–432, 798–800; 180/65.1–65.3; 320/29–47, 121; 322/11–13

(56) References Cited

U.S. PATENT DOCUMENTS

| | | | | |
|---|---|---|---|---|
| 5,264,764 A | * | 11/1993 | Kuang | 318/139 |
| 5,481,168 A | * | 1/1996 | Mutoh et al. | 318/432 |
| 5,569,999 A | * | 10/1996 | Boll et al. | 320/136 |
| 5,608,308 A | * | 3/1997 | Kiuchi et al. | 322/11 |
| 6,118,237 A | * | 9/2000 | Kikuchi et al. | 318/139 |
| 6,377,880 B1 | * | 4/2002 | Kato et al. | 701/29 |
| 6,452,286 B1 | * | 9/2002 | Kubo et al. | 290/40 C |
| 6,727,670 B1 | * | 4/2004 | Grabowski et al. | 318/432 |
| 6,757,598 B2 | * | 6/2004 | Okoshi | 701/22 |

FOREIGN PATENT DOCUMENTS

| | | | |
|---|---|---|---|
| JP | 60-084901 | 5/1985 | |
| JP | 09-074605 | * 3/1997 | B60L/7/10 |
| JP | 2003-087901 | * 3/2004 | B60L/3/00 |

* cited by examiner

*Primary Examiner*—David Martin
*Assistant Examiner*—Tyrone Smith
(74) *Attorney, Agent, or Firm*—Arent Fox PLLC

(57) ABSTRACT

A drive unit for vehicles prevents the rise of temperature of a high-pressure battery or condenser and assists the vehicle engine using a motor activated by an electric current supplied from the battery. The drive unit includes a battery temperature sensor and battery ammeter sensor, and defines the permissible current value of input-and-output current, which is limit of a current value to be inputted-and-outputted with respect to the battery, based on the difference between the battery temperature and the upper limit. When the battery temperature exceeds the threshold temperature, the permissible current value is set. Moreover, when the exchanged current value of the output-and-input current exceeds the permissible current value, the motor gradually decreases the output command value.

14 Claims, 11 Drawing Sheets

[TIME CHART 2]

VEHICLE DRIVING APPARATUS

FIELD OF THE INVENTION

The present invention relates to a drive unit for vehicle, which supplies the driving force in order to travel a vehicle to be driven by the generator motor, and which assists the supply of the driving force of the internal combustion engine equipped in a vehicle.

BACKGROUND ART

A hybrid vehicle equipped with an engine and a motor has been known. In this hybrid vehicle, the motor works as a generator at the time of braking. Thereby, the braking of the hybrid vehicle is performed while obtaining the electric energy from the conversion of the kinetic energy of a vehicle. Hereinafter, to obtaining the electric energy using the motor defined as "regeneration". This braking manner defined as "regenerative braking".

In the hybrid vehicle, furthermore, electric energy obtained from the regenerative braking is stored in a high-pressure battery and is used at the time of acceleration, etc. Thereby, the hybrid vehicle can save the waste of energy than the conventional vehicle adopting the internal combustion engine. In the following explanation, the hybrid vehicle defined as "vehicle".

FIG. 11 is a block diagram showing the construction relevant to the motor and high-pressure battery of the hybrid vehicle, which is disclosed in Japanese Patent Publication Hei 11-187577.

In FIG. 11, a motor 112 and a high-pressure battery 117 are connected each other through an inverter 116.

The electric energy stored in the high-pressure battery 117 is supplied to the motor 112 through the inverter 116 at the time of acceleration, and assists the power supply of the engine (not shown).

The motor 112, on the other hand, works as a generator at the time of braking. Thus, the electric energy (regenerative energy) obtained from the regeneration of the motor 112 is stored in the high-pressure battery 117 through the inverter 116.

In FIG. 11, the symbol TS indicates a temperature sensor which senses the temperature of the high-pressure battery 117. The symbol A indicates the ammeter, which senses the input-and-output current of the high-pressure battery 117. The symbol V indicates the voltmeter, which senses the voltage of the high-pressure battery 117. The symbol CU indicates the control-unit.

A hybrid vehicle is used under various ambient conditions, for example, from high temperature environment, i.e. desert, to the low temperature environment. But, there is an optimum temperature for operating each battery including the high-pressure battery 117.

When the electric current of high amount, for example, is discharged on the condition that the temperature of the high-pressure battery 117 is low, the voltage of the high-pressure battery 117 will be dropped because the reaction rate of the high-pressure battery becomes slow.

When the charge of the high-pressure battery 117 is carried out on the condition that the temperature of the high-pressure battery 117 is high, the deterioration of the high-pressure battery 117 will be advanced because the temperature of the high-pressure battery 117 becomes much higher.

For this reason, the charge/discharge of the high-pressure battery 117 is managed by the inverter 116 based on the map (power-saving map) shown in FIG. 12. In this occasion, the inverter 116 is controlled by the control-unit UC.

In the upper half of FIG. 12, the upper limit value of the current to be discharged from the high-pressure battery 117 is shown in longitudinal axis, and the temperature of the high-pressure battery 117 is shown in horizontal axis. In other words, upper half of FIG. 12 is a map used in order to control the upper limit of the electric energy to be discharged from the high-pressure battery 117 at each temperature.

In the lower half of FIG. 12, on the contrary, the upper limit of the electric energy to be charged on the high-pressure battery 117 is shown in longitudinal axis, and the temperature of the high-pressure battery 117 is shown in horizontal axis. In other words, the lower half of FIG. 12 is a map used in order to control the upper limit of the electric energy charged on the high-pressure battery 117 at each temperature.

The control-unit CU performs the management of the charge/discharge of the high-pressure battery 117 based on the upper limit value, which is determined with reference to the map (power saving map) according to the detected temperature of the high-pressure battery 117.

When the above-described management, the charge/discharge management, of the high-pressure battery 117 is performed, problems described below have been brought out.

(1) When the frequency of the charge/discharge of the high-pressure battery 117 is high, since the temperature of the high-pressure battery 117 does not drop easily owing to the thermal mass, the temperature of the high-pressure battery 117 will exceeds 45 degrees (maximum temperature) greatly.

(2) When the temperature of the high-pressure battery 117 exceeds 45 degrees and approaches to 50 degrees, the output current discharged from the high-pressure battery 117 will become small largely. In other words, the power outputted from the high-pressure battery 117 becomes low. Thus, a driver of the hybrid vehicle feels the powerlessness.

(3) When the temperature exceeds 45 degrees, since the total charge amount of electric energy obtained from the regenerative power generation will be restricted, the charge of the high-pressure battery 117 cannot be fully achieved. Thereby, the remaining amount in the high-pressure battery 117 becomes small because the discharge amount exceeds the charge amount. Thus, the driving power to be outputted from the motor becomes low.

The present invention mainly aims at providing a drive unit, which can prevent or control the temperature rise of the high-pressure battery.

DESCRIPTION OF THE INVENTION

The present invention relates to a drive unit for a vehicle that utilize a generator motor activated by an electric current supplied from a condenser to drive a vehicle and assists an internal combustion engine driving in a vehicle.

This drive unit includes a temperature detector, a current value detector, a calculator, a current value determiner, and a command value corrector.

The temperature detector detects a temperature of the condenser. The current value detector detects the current value inputted to and outputted from the condenser. The calculator computes a permissible current value that can be inputted to and outputted from the condenser, based on a difference between a temperature of the condenser and a predetermined upper limit temperature when the temperature of the condenser exceeds a threshold temperature. The current value determiner determines whether or not the current value that inputted to and outputted from the condenser exceeds the permissible current value. The command value corrector lessens a torque command value of the generator motor when said current value determiner determines that the current value inputted to and outputted from the condenser exceeds the permissible current value.

The drive unit according to the present invention is adopted in the hybrid vehicle. According to the present invention, a permissible current value of the current value, which is inputted to and outputted from the condenser, is assigned based on the difference between the upper limit temperature of a condenser and a real temperature of a condenser. Here, this real temperature of a condenser is detected by a temperature detector.

In the present invention, when the current value larger than the permissible current value is detected, the torque command value of the generator motor is made smaller. Thereby, the heat generation of the condenser becomes high and then the rise of the temperature of the condenser is restricted or prevented because the current value inputted to and outputted from the condenser becomes small, Accordingly, the temperature management of the condenser can be achieved. Thus, the temperature of the condenser is kept equal to or below the predetermined upper limit temperature.

In the present invention, furthermore, the determination whether or not the current value inputted to and outputted from the generator exceeds the permissible current value is performed using the average value of the electric current. To be more precise, this judgment is performed using the exchanged current value average, which is an average value of total electric current to be charged on/discharged from the battery.

In the present invention, preferably, the command value corrector may include a coefficient multiplier. This coefficient multiplier multiply a coefficient by torque command value inputted to said generator motor in order to give a limit to said torque command value.

The coefficient multiplier includes a restriction adder and a restriction reducer.

The restriction adder lessens the torque command value by making the coefficient gradually smaller by a predetermined value for every predetermined time when the current value inputted to and outputted from the condenser exceeds the permissible current value. The restriction reducer makes the torque command value gradually larger by making the coefficient larger by predetermined value for every predetermined time when the current value inputted to and outputted from the condenser becomes equal to or below the permissible current value.

it is unfavorable for the commercial value of a vehicle, if the rapid rise or drop of output command value comes arise, because a driver might receive the uncomfortable feelings.

In the present invention, the torque command value is made gradually smaller even if the restriction of the torque command value is given/terminated while the throttle pedal is stepped by a driver. Thus, the change of the torque command value does not cause uncomfortable feelings to a driver.

In the present invention, preferably, the drive unit for a vehicle may include a minimum torque command value generator. The minimum torque command value generator outputs a predetermined minimum torque command value and disables the command value corrector, if high torque value is instantaneously inputted as the torque command value when the temperature of the condenser exceeds said upper limit temperature.

When the torque command value is enlarged in compliance with the input of the torque value under the condition that the torque command value is restricted at small value, since the temperature of the condenser is arisen, it is unfavorable.

On the contrary, it is not affected that the torque command value is made larger in short period of times in compliance with the input of the torque command of high value. Thus, the outputs of the torque command value of high value is favorable for Drive ability, and is also favorable for regenerative braking.

In the present embodiment, when the torque command value of high torque is inputted in short period of time, the command value corrector is made into no operative condition. Thus, the predetermined torque command valued of lower limit is outputted. In other words, the predetermined torque value having a higher value than the torque command value to be restricted by the command value corrector is outputted.

In the present invention, preferably, the permissible current value may obtain from formula (1), when a temperature of the condenser exceeds the predetermined temperature:

$$\text{Permissible current value}(Is) = \sqrt{\frac{(UT - BT) \times CC}{IR}} \quad (1)$$

wherein UT is a upper limit temperature, BT is a condenser temperature, CC is a cooling coefficient, and IR is internal resistance.

According to the present invention, the permissible current value can be obtained from the Formula (1) when the temperature difference between the upper limit temperature and the real temperature, the cooling coefficient of the generator, and the internal resistance are obtained. Thus, the temperature of the condenser (battery temperature) is certainly kept at equal to or below the upper limit temperature when temperature management is performed based on Formula (1) In this occasion, the cooling coefficient and the internal resistance are predetermined value.

In the present invention, still further preferably, the permissible current value may obtain from formula (2), when a temperature of the condenser exceeds the predetermined temperature:

$$\text{Permissible current value}(Is) = \sqrt{\frac{UT + HC \times CC(TG - TI)}{IR \times CC}} \quad (2)$$

where UT is a upper limit temperature, HC is heat-transmitting coefficient, TG is generator temperature, TI is ingressive temperature, IR is internal resistance, and CC is calorific capacity.

According to the present invention, the permissible current value of the generator can be obtained from Formula (2) based on the cooling efficiency of the generator, and the calorific value and the upper limit temperature of the generator. Thus, the temperature of the generator is certainly kelp at equal to or below the upper limit temperature. Here, the internal resistances, the heat pass coefficient, Heat capacity are predetermined value. The temperature of the generator (battery temperature) and the ingressive temperature are real detected value.

DETAILED DESCRIPTION OF THE PREFERRED EMBODIMENT

Figure 1:
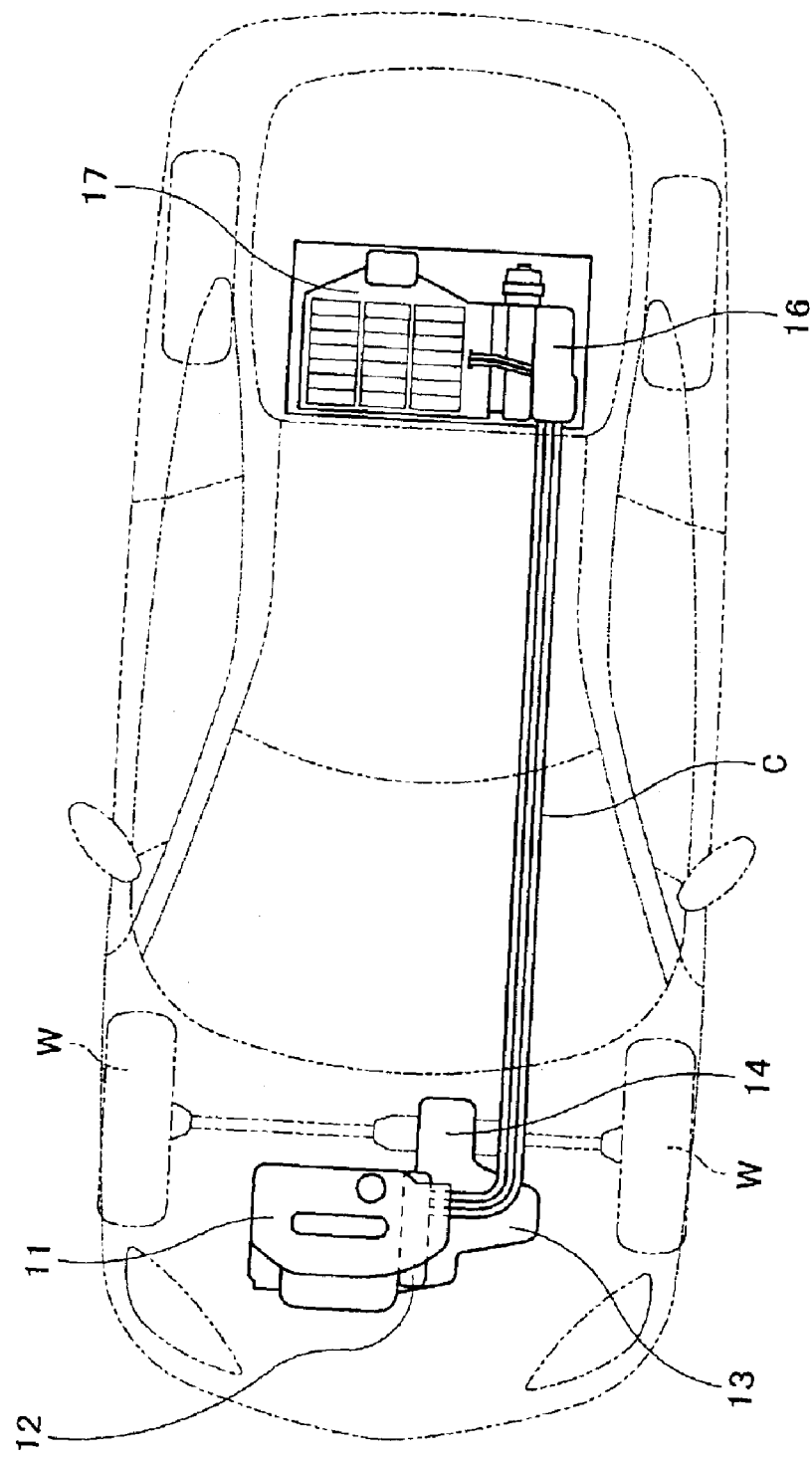
FIG. 1 is penetrative plan view showing the layout of equipments in the hybrid vehicle equipped with the drive unit according to the present invention.

The explanation about the preferred embodiment of the present invention will be carried out referring to the attached drawings. FIG. 1 is a perspective plan view showing the layout of the equipments equipped in the hybrid vehicle.

Hybrid Vehicle

As shown in FIG. 1, a hybrid vehicle has an engine 11, a motor 12, a transmission 13, and a differential unit 14 at the fore side thereof, and has an inverter 16 and a high-pressure battery 17 at the rear side thereof. The symbol C indicates a high-voltage cable, which connects the motor 12 with inverter 16. The engine 11 and the motor 12 are directly connected each other through a driving shaft (not shown).

The motor 12 is used for starting the engine 11, for assisting the power supply of the engine 11 according to the cruising conditions of a vehicle, for performing the generation using the regenerative energy obtained from the regenerative motion at the time of braking, and for performing the generation using the output of the engine 11 according to the cruising conditions of the vehicle. In other words, the motor 12 is a generator motor serves as the generator.

The transmission 13 transmits the rotative velocity of the driving shaft (not shown) of the engine 11 and the motor 12 to the differential unit 14. The differential unit 14 adjusts the difference of the rotative velocity between the driven wheels W, W of both sides. In other words, this differential unit 14 allows the rotation of the wheels W,W at different rotative velocity.

Each of the drive wheels W, W transmits the driving force given from the engine 11 or motor 12 to the road surface, and also transmits the steering force to the road surface. The transmission 13 and the differential unit 14 transmit the driving force given from drive wheels W, W at the time of braking to the motor 12.

The inverter 16 is controlled by the control-unit (shown in FIG. 2) comprising a microcomputer, and performs the power saving of a vehicle. In other words, the inverter 16 controls (manages) the charge/discharge of the high-pressure battery 17. The high-pressure battery 17 is a unit cell formed by connecting a plurality of Nickel Metal Hydride batteries.

When the motor 12 is driven using the electric power stored in the high-pressure battery 17, the electric power stored in the high-pressure battery 17 is discharged and is supplied to the motor 12 through the inverter 16.

When the motor 12 performs the power generation, on the other hand, the electric energy (electric power) generated by the regenerative motion of the motor 12 is supplied to the high-pressure battery 17 through the inverter 16, and is stored therein.

Drive Unit for Vehicle

Figure 2:
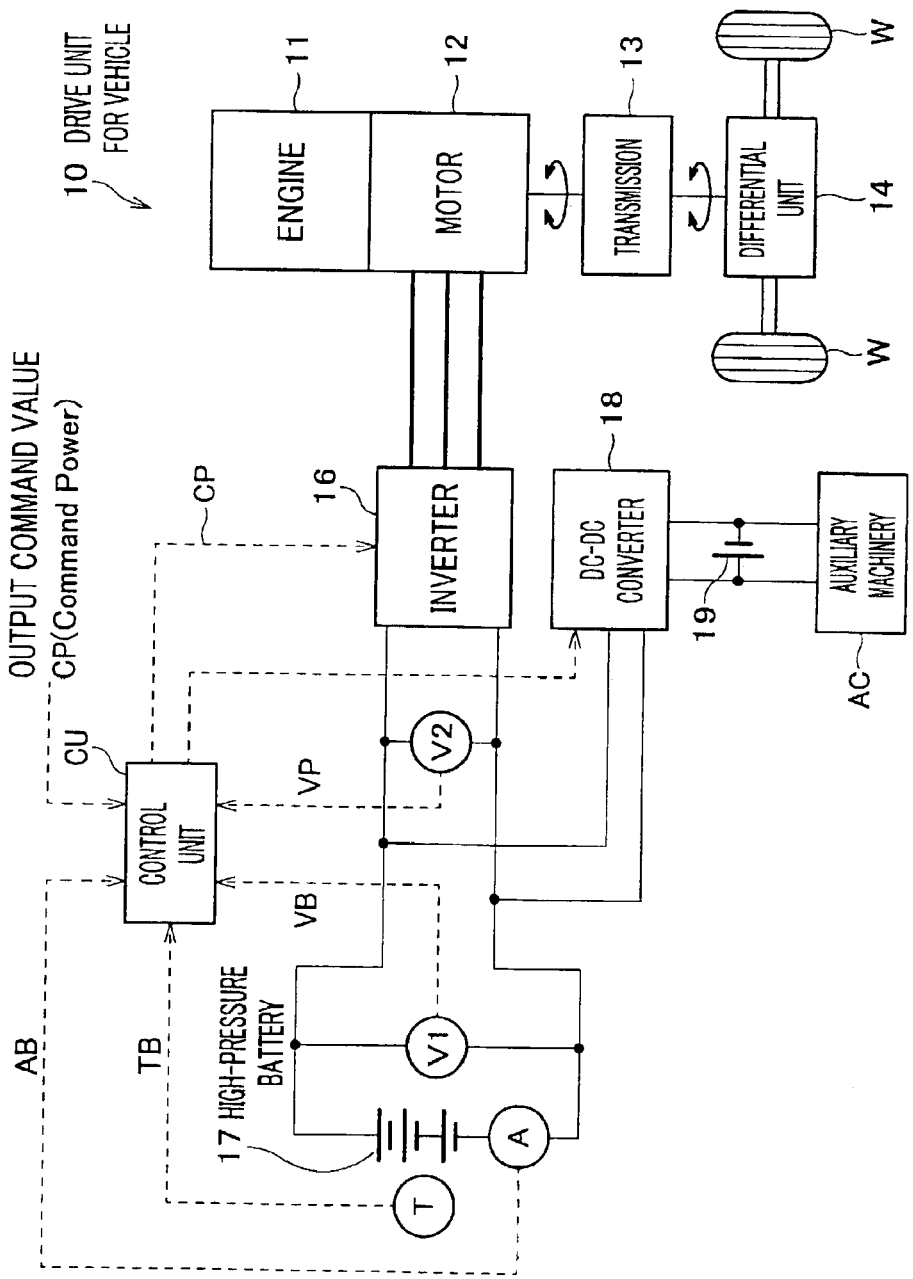
FIG. 2 is a block diagram of a drive unit according to the present invention.

The explanation about the preferred embodiment of the present invention will be carried out referring to FIG. 2. FIG. 2 is a block diagram of a drive unit for vehicles.

As shown in FIG. 2, a driven unit 10 for a vehicle according to the present embodiment has an engine 11, a motor 12, a transmission 13, a differential unit 14, an inverter 16, a high-pressure battery 17, a DC-DC converter 18, a low-pressure battery 19, a control-unit CU, a battery voltmeter V1, an inverter voltmeter V2, an ammeter A, and a temperature sensor T.

The battery voltmeter V1 detects the voltage of the high-pressure battery 17. The inverter voltmeter V2 detects the voltage between terminals of the inverter 16. The ammeter A detects the current value to be inputted to or outputted from the high-pressure battery 17. The temperature sensor T detects the temperature (battery temperature, generator temperature) of the high-pressure battery 17.

The inverter 16 performs the driving or the regenerative motion of the motor 12 in compliance with the output command CP (torque command value).

The inverter 16, for example, is a PWM inverter adopting the Pulse Width Modulation technique, and has a bridge circuit (not shown), to which a plurality of switching elements are connected by the bridge connection.

The low-pressure battery 19 is a battery, which drives the auxiliary machinery AC, such as electric power steering apparatus, and the air compressor for air conditioner etc. The low-pressure battery 19 is also connected to the inverter 16 and the high-pressure battery 17 through the DC-DC converter 18.

The DC-DC converter 18 performs the step-down of the battery voltage VB of the high-pressure battery 17 or the inverter voltage VP of the inverter 16, and charges the low-pressure battery 19. Here, the inverter voltage VP is given when the regenerative motion or step-up motion of the motor 12 is performed.

Control-Unit

Figure 3:
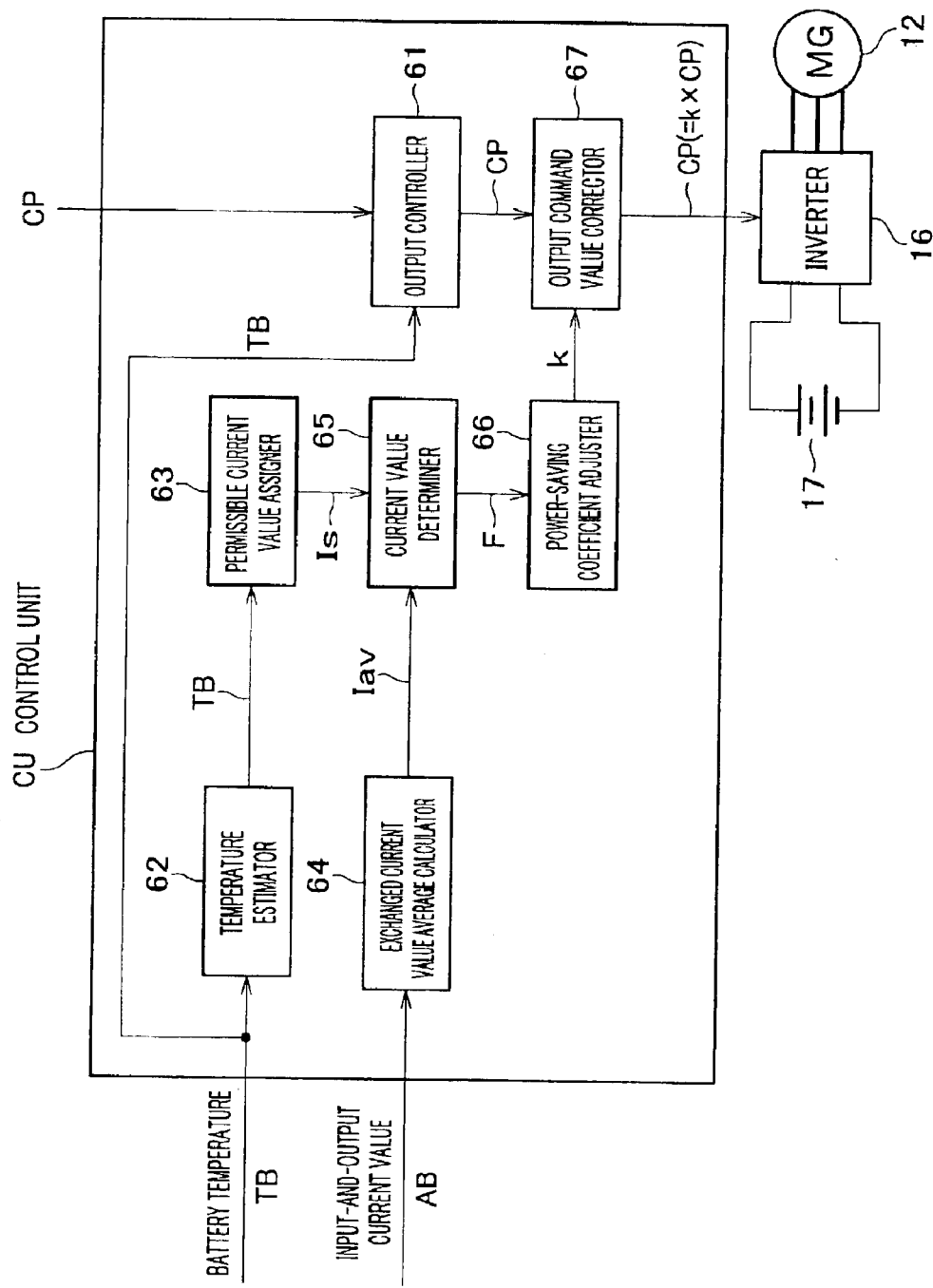
FIG. 3 is a block diagram of a control-unit shown in FIG. 2.
Figure 4:
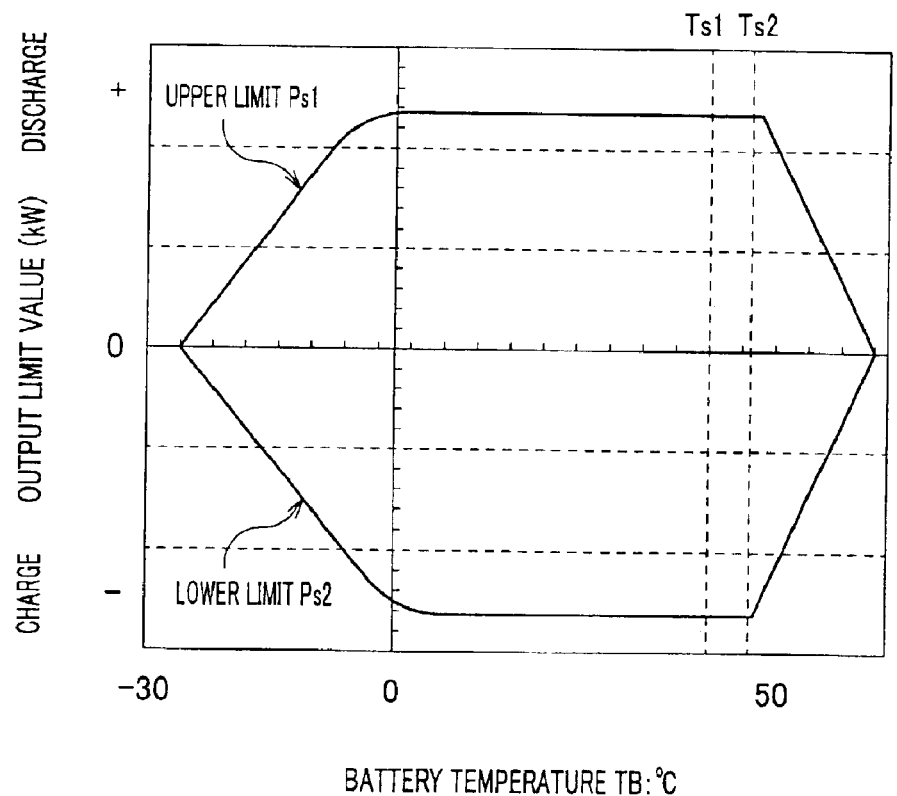
FIG. 4 is a power-saving map used for charge/discharge management of a high-pressure battery.
Figure 5:
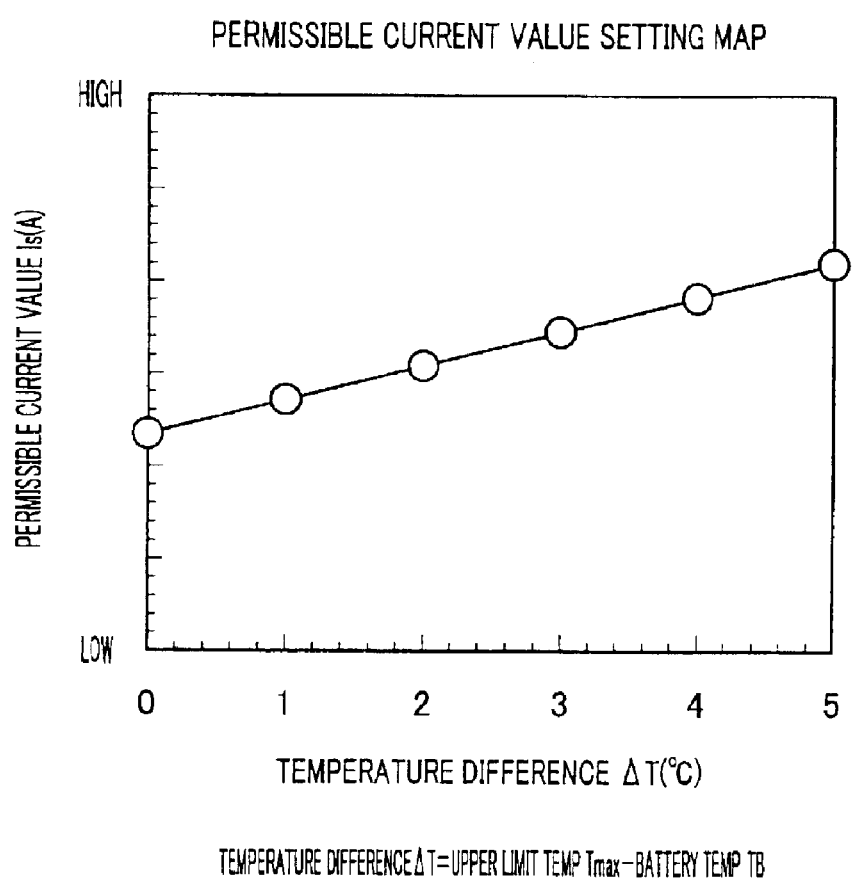
FIG. 5 is a map used in order to determine the permissible current value Is based on the difference ΔT between the upper limit temperature Tmax of the high-pressure battery and the real battery temperature TB.

The explanation about the control-unit CU will be carried out referring to FIG. 3 through FIG. 5 of the attached drawings. FIG. 3 is a block diagram showing the composition of the controller. FIG. 4 is a power-saving map for controlling (managing) the charge/discharge of the high-pressure battery. FIG. 5 is a map, from which the permissible current value Is is defined using the difference ΔT between the upper limit temperature Tmax of the high-pressure battery and the real battery temperature TB.

As shown in FIG. 3, the control-unit CU has an output controller 61, a temperature estimator 62, a permissible current value assigner 63, an exchanged current value average calculator 64, a current value determiner 65, a power-saving coefficient adjuster 66, and an output command value corrector 67.

In the control-unit CU, all of the data to be exchanged is digital formats. The control-unit UC repeats the processing at every interval, for example every millisecond time scale.

The output controller 61 has a Map reference function. The output command value CP, which is generated by another control-units (not shown) based on the throttle opening ratio (θth) and the battery voltage VB, and the battery temperature TB, which is detected by the battery temperature sensor T, are inputted to the output controller 61.

The upper limit Ps1 and the lower limit Ps2 of the output limit value is defined from the power-saving map (FIG. 4) based on the battery temperature TB.

When the output command value CP to be inputted to the output controller 61 is larger than the upper limit Ps1, the upper limit Ps1 obtained by the reference of the power-saving map is outputted to the output command value corrector 67 instead of the inputted output command value CP.

When the output command value CP to be inputted to the output controller 61 is smaller than the lower limit Ps2, the lower limit Ps2 is outputted to the output command value corrector 67 instead of the inputted output command value CP.

When the polarity of the output command value CP is positive, the electric power stored in the high-pressure battery 17 is discharged and is supplied to the motor 12 through the inverter 16.

When the polarity of the output command value CP is negative, the electric power generated by the motor 12 is supplied to the high-pressure battery 17 through the inverter 16, and charged therein. Here, the output command value CP corresponds to the "torque command value".

The temperature estimator 62 has a comparison function etc. The temperature estimator 62 judges whether or not the battery temperature TB exceeds the threshold temperature Ts1, for example, 40 degree. When the battery temperature TB exceeds the threshold temperature Ts1, the temperature estimator 62 outputs the battery temperature TB to the permissible current value assigner 63. Thus, the permissible current value assigner 63 is commanded to perform the setting of the permissible current value Is.

The threshold temperature Ts1 is the reference temperature, by which the temperature-rise prevention control is started. This temperature rise prevention control is performed so that the battery temperature TB does not exceed the upper limit temperature Ts2, for example 45 degree. After considering the relation between cooling capacity and the calorific value of the high-pressure battery 17, the value smaller than the upper limit temperature Ts2 by just predefined value is defined as the threshold temperature Ts1.

The permissible current value assigner 63 has a map reference function etc., and defines the permissible current value Is with reference to the Map shown in FIG. 5. In this occasion, the reference of the Map is performed based on the temperature differences ΔT between the predetermined upper limit temperature Ts2 and the inputted battery temperature TB.

Here, the permissible current value is a limit of the current value can be outputted from or can be inputted to the high-pressure battery 17. The upper limit temperature is a previously defined temperature value, and the battery temperature TB is an inputted temperature value. Herein, temperature differences ΔT=Ts2−TB.

Then, the permissible current value Is, which is a limit of the current value can be outputted from or inputted to the high-pressure battery 17, is determined by the permissible current value assigner 63 based on the temperature differences ΔT.

The permissible current value Is is established so that the battery temperature may not exceeds the upper limit temperature Ts2, and is changed depending on the heat capacity and cooling constants of the high-pressure battery 17, and etc.

The permissible current value Is after established (assigned) is outputted to the current value determiner 65.

The map shown in FIG. 5 is made based on experiment, theoretical calculation, etc., and is designed so that the permissible current value Is becomes smaller as the temperature difference ΔT becomes smaller.

In the present embodiment, a current value AB to be inputted/outputted with respect to the high-pressure battery 17 is controlled to the small value as the permissible current value IS becomes smaller. Because the calorific value of high-pressure battery 17 can be controlled if the current value AB made smaller. Hereinafter, a current value AB inputted to and outputted from the high-pressure battery 17 is defined as the input-and-output current value AB. In other words, the prevention of the temperature rise of the high-pressure battery 17 can be achieved if the input-and-output current value AB is controlled to the small value.

The permissible current value assigner 63 corresponds to the calculator, which computes the permissible current value Is to be inputted to or outputted from the generator.

The exchanged current value average calculator 64 memorizes the absolute value of the input-and-output current value AB for the past n times, and calculates the average thereof as the exchanged current value average Iav. This exchanged current value average Iav is an average value for the past n times of the charged/discharged current value of the high-pressure battery 17.

The exchanged current value average Iav is calculated for abrogating the influence of an unusual value etc., and for achieving the stable controlling.

In the present embodiment, the exchanged current value average Iav is computed in the absolute value of the input-and-output current value AB, because the high-pressure battery 17 causes heat irrespective of the polarity of the current value, which is inputted to and outputted from the high-pressure battery 17. In other words, since heat arises whenever the input-and-output of current to the high-pressure battery 17 is carried out, the absolute value of the input-and-output current value AB is used for computing the exchanged current value average Iav.

The exchanged current value average Iav may be obtained from the input-and-output current value AB, which has the polarity of positive or negative, instead of the input-and-output current value AB, which is an absolute value.

The current value determiner 65 has a comparison function etc., and compares the permissible current value Is with the exchanged current value average Iav. When the exchanged current value average Iav exceeds the permissible current value Is, (Iav>Is), the judgment flag F is set as H. When the exchanged current value average Iav is equal to or below the permissible current value Is, (Iav<=Is), on the other hand, the judgment flag F is set as L.

The current value determiner 65 transmits the judgment flag F to the power-saving coefficient adjuster 66.

The power-saving coefficient adjuster 66 has an adder-subtracter function etc.

When the judgment flag F is H, the power-saving coefficient k is gradually made smaller in order to prevent the rise of the battery temperature TB. To be more precise, when the exchanged current value average Iav exceeds the permissible current value Is, (Iav>Is), the power-saving coefficient k is gradually made smaller for controlling the input-and-output current value AB ($\propto$ output command value) of the high-pressure battery 17. Thereby, the rise of the battery temperature TB is prevented.

This power-saving coefficient k is the coefficient, by which the output restriction is defined.

The power saving, the restriction of the output, is not performed when the power-saving coefficient k is 1 (or 100%), and if this coefficient k becomes smaller, power save will be performed greatly.

The power-saving coefficient k is controlled so as to decrease gradually for every predetermined time, for example, it is made small at the speed for 0.03/15 seconds (three point/15 seconds) (decrement). That is, it is after 15 seconds that the power-saving coefficient k, which was 1 (100%) last time, is set to 0.97 (97%).

This decreasing of the power-saving coefficient k at predetermined rate is performed in order to prevent the occurrence of the uncomfortable feeling to a driver. Because if the power-saving coefficient k is changed rapidly, since output power from the motor is also changed rapidly, the cruising of vehicle becomes jerkily. Thus, the uncomfortable feeling is given to a driver.

When the judgment flag F is L, on the other hand, the power-saving coefficient adjuster 66 makes the power-saving coefficient k gradually larger (returns to 1[=100%]) for canceling the restriction (control) by the power-saving coefficient k. In other words, when the exchanged current value average Iav becomes smaller than the permissible current value Is, the power-saving coefficient k is made gradually larger in order to cancel the restriction by the power-saving coefficient k.

In that occasion, however, if the power-saving coefficient K is rapidly made larger (returned), a driver may feel the uncomfortable feeling. For preventing the occurrences of such uncomfortable feelings to a driver, the power-saving coefficient k is made gradually larger at every predetermined interval, for example, 0.03/25 seconds, (increment). When the power-saving coefficient K is less than 1, and if the battery temperature TB becomes less than threshold temperature Ts1, the judgment flag F to be transmitted from the current value determiner 65 is L. In this occasion, the power-saving coefficient K is gradually returned to 1 for preventing the occurrence of the uncomfortable feeling to a driver.

Both of the power-saving coefficient adjuster 66 and the output command value corrector 67 play a role of the command value corrector.

Moreover, the power-saving coefficient adjuster 66 plays a role of the restriction adder and the restriction reducer.

The output command value corrector 67 has a comparison function, a multiplication function, etc. When the polarity of the output command value CP is positive (i.e. when it is going to assist), the output command value corrector 67 carries out the multiplication of the power-saving coefficient k and the output command value CP, and outputs the result of the multiplication to the inverter 16 as the corrected command value CP.

When the polarity of the output command value CP is negative, the output command value corrector 67 performs the multiplication of the power-saving coefficient k and the value, which is obtained by increasing the inputted output command CP by 10%. Then, the output command value corrector 67 outputs the multiplication result to the inverter 16 as the corrected output command value CP. To be more precise, the corrected output command value CP=CP× 1.10×k when the polarity is negative (regeneration), the corrected output command value CP=CP×k when the polarity is positive (assistance).

The output command value corrector 67 corresponds to the coefficient multiplier.

The reason why the output command value CP is made larger when the regeneration is performed will be described as below.

In the high-pressure battery 17, the battery voltage VB varies according to the difference in the operation mode thereof, e.g. the assistance mode (discharge), the regenerative mode (charge). In case of regenerative mode, the battery voltage VB of the high-pressure battery 17 becomes higher than the case of assistance mode (I-V characteristic). Thereby, the input-and-output current value AB at the time of regenerative mode becomes lower than at the time of assistance mode even if the output command value CP is same.

Accordingly, the output command value CP at the time of regeneration should be made larger in order to enlarge the input-and-output current value. In other words, for performing the regeneration effectively, the output command value CP at the time of regeneration should be made larger. When the initial battery voltage VB of the high-pressure battery 17 is 140V, if the motor 12 is driven by the output command value CP=2 kw in order to assist the driving force of engine 11, the battery voltage VB will drop from 140V to 130V as a result of discharge. In this occasion, the actual input-and-output current value AB becomes about 15 ampere (A) (in this case, Current flows well). When the regeneration is performed on the same conditions (VB=140V, CP=2 kw), the battery voltage VB will raise from 140V to 150V because the electric current given by the regeneration flows into the battery 17. Thus, the actual input-and-output current value AB (current value with which CP=2 kw is filled) is decreased to about 13 ampere (A).

In the case of regeneration, in which the input-and-output current value AB becomes small, the output command value CP is always multiplied by 10% irrespective of the value of the power-saving coefficient. Thereby, the same amount of the input-and-output current value AB as at the time of assistance mode will be streamed when the regeneration is performed As described above, the multiplication in compliance with the operation mode of the motor is preformed. Thereby, the rise of the temperature of the high-pressure battery 17 is prevented because the input-and-output current value AB (current value to be discharged) discharged from the high-pressure battery 17 is controlled, when the polarity of the output command value CP is positive, e.g. at the time of assistance mode.

The temperature rise of the high-pressure battery 17 in case the polarity of the output command value CP is negative (in case of regeneration) is also prevented. Because the input-and-output current value AB to be charged in the high-pressure battery 17 is controlled.

The output command value CP is also multiplied by 10% at the time of the regeneration mode, in which the input-and-output current value AB becomes small as a result of the rise of the battery voltage VB. Thus, the input-and-output current value AB having a same amount as at the time of assistance mode can be charged to the high-pressure battery 17. In other words, the recovery rate of the regenerative energy is improved. In the present embodiment, the control-unit CU not only acts as output restrictor of a motor 12, but also a charge restrictor of the high-pressure battery 17.

Control Flow

The control manner performed by the control-unit CU disposed in the drive unit 10 will be explained with reference to the control flow chart shown in FIG. 6. In this control manner, the control flow chart is performed repeatedly by the predetermined interval, for example, dozens of milliseconds.

First, the battery temperature TB detected by the battery temperature sensor T is inputted to the temperature estimator 62 (Step S11).

Next, the temperature estimator 62 checks whether or not the battery temperature TB is larger than the threshold temperature Ts1 (for example, 40 degrees), Battery temperature TB> Threshold temperature Ts1. When the battery temperature is not larger than the threshold value Ts1, the processing terminates in this Step (Step S12). In other words, the correction of the output command value CP using the power-saving coefficient K is not performed, when the battery temperature is smaller than the threshold value (temperature Ts1).

When the battery temperature TB exceeds the threshold temperature Ts1, on the other hand, the permissible current value assigner 63 defines the permissible current value Is by referring to the Map shown in FIG. 5 based on the battery temperature TB (Step S13).

The exchanged current value average calculator 64 computes the exchanged current value average Iav detected by the ammeter A (Step S14).

The current value determiner 65 checks whether or not the exchanged current value average Iav exceeds the permissible current value Is, Iav>Is, (Step S15).

When the exchanged current value average Iav exceeds the permissible current value Is, the power-saving coefficient adjuster 66 makes the power-saving coefficient k gradually smaller for preventing the rise of the battery temperature TB by making the output command value CP smaller (Step S16).

When the exchanged current value average Iav is below the permissible current value Is, on the other hand, the power-saving coefficient adjuster 66 makes the power-saving coefficient k larger toward the initial value (1 or 100%) (Step S17).

Then, the output command value corrector 67 corrects the output command value CP by performing the multiplication of the power-saving coefficient k to the output command value CP. Here, the power-saving coefficient k defined in Step 16 of Step 17 is used.

In case of regeneration, additionally, the output command value CP is always multiplied by 10% (CP=CP×1.1×k), irrespective of the value of the power-saving coefficient K.

By multiplying the output command value CP using the power-saving coefficient k, the rise of the battery temperature TB can be controlled without causing uncomfortable feelings to a driver even when the battery temperature TB of the high-pressure battery rises.

In the present embodiment, furthermore, the permissible current value Is is assigned on the basis of the upper limit temperature Ts2 (for example, 45 degrees). Thus, the battery temperature TB is effectively controlled so that the battery temperature TB does not rise more than the upper limit temperature Ts2.

As can be seen from FIG. 4, when the battery temperature Ts2 is controlled below the upper limit temperature Ts2, the range, from which the output limit value is defined, becomes widest. Thus, the performance of hybrid vehicles can fully be demonstrated because the restriction of the output limit value becomes rather loose. In other words, when the rise more than the upper limit temperature Ts2 is prevented, the output limit value is defined from rather loose restriction range. Thus, the performance of hybrid vehicles can fully be demonstrated because the restriction of the output limit value becomes loose.

Time Chart 1

Figure 7:
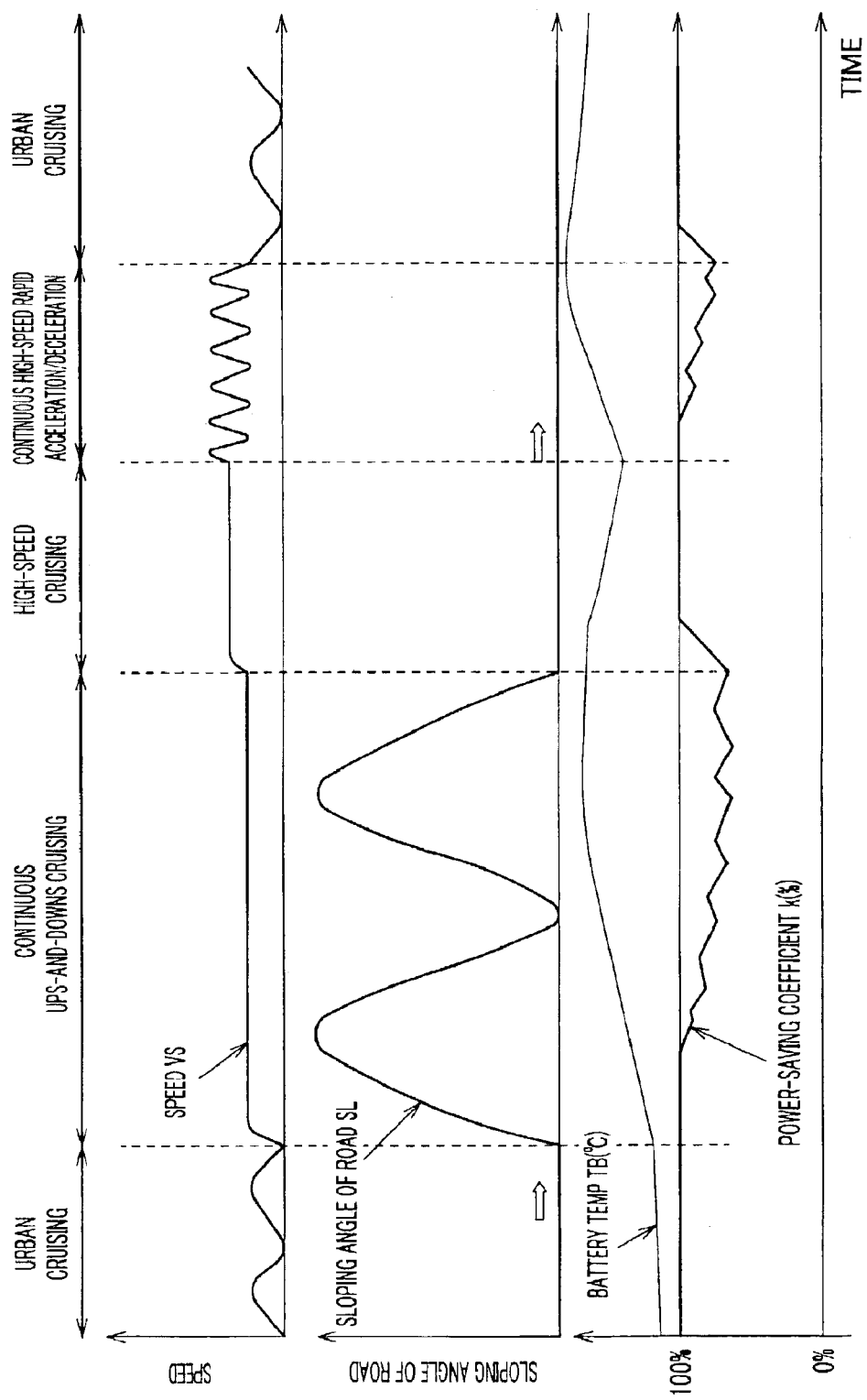
FIG. 7 is a time chart, which indicates the brief change of the power-saving coefficient, and which indicates the change of the battery temperature in compliance with the cruising condition.

The operation of the drive unit 10 for vehicle will be explained by referring to the time chart shown in FIG. 7. FIG. 7 is a time chart showing the brief transition of the battery temperature and the power-saving coefficient depending on the driving condition.

In FIG. 7, the time chart, which shows the transition of the battery temperature TB of the high-pressure battery 17 depending on the change of the cruising condition or state of a vehicle, i.e. the change of the sloping angle SL of the road or the change of the cruising speed, is shown.

In FIG. 7, moreover, the graph shown in bottom with bold line is a time chart showing the transition of the power-saving coefficient k.

As can be seen from FIG. 7, the cruising condition of the vehicle changes in order of "Urban cruising", "Continuous ups-and-downs cruising", "High-speed cruising", "Continuous high-speed rapid acceleration/deceleration cruising", and "Urban cruising". Here, "Urban cruising" means that the vehicle is cruising on the urban road. "Continuous ups-and-downs cruising" means that the vehicle is cruising at constant speed on the road having continuous ups-and-downs. "Continuous high-speed rapid acceleration/deceleration cruising" means that the vehicle is cruising with repeating a rapid acceleration and a rapid braking by turns.

In the drive unit 10, hybrid vehicle, the driving force is supplied from both engine 11 and motor 12 at the time of acceleration, and is only supplied from the engine 11 at the time of cruising. In the case of braking (regenerative mode), additionally, the electric current is generated by the motor 12, and is charged in the high-pressure battery 17.

Thereby, the hybrid vehicle can drive the engine 11 efficiently enough, and can utilize the regenerative energy given as a result of the regenerative generation by the motor 12.

Operation of the drive unit 10 for vehicles will be explained with reference to the time chart of FIG. 7.

In case of "Urban cruising", the acceleration and the braking of the vehicle is performed depending on the traffic condition, such as stop by stoplight. In this vehicle, the motor 12 assists the engine 11 at the time of acceleration, and performs the regenerative generation at the time of slowdown (braking). Accordingly, the charge and discharge of the high-pressure battery 17 is repeated by turns in case of "Urban cruising".

As shown in FIG. 7, the battery temperature TB rises a little at the time of "Urban cruising". In that occasion, however, the power save coefficient k is still in state of 100% (1).

In the "Urban cruising", the vehicle cruises in the state that the battery temperature TB does not exceed the threshold temperature Ts1 (for example 40 degree), or in the state that the exchanged current value average Iav does not exceed the permissible current value Is, even though the battery temperature TB exceeds the threshold temperature Ts1.

Next, the cruising condition changes to "Continuous ups-and-downs cruising". In the "Continuous ups-and-downs cruising", the vehicle cruises on the road having continuous ups-and-downs at constant speed. The high-pressure battery 17 is discharged at the time of uphill cruising, and is charged at the time of downhill cruising.

Thereby, the more input-and-output current flows at the time of uphill cruising or downhill cruising than the urban cruising. Thus, the rise of the battery temperature TB is arisen. For preventing the rise of the battery temperature TB, as shown in Time chart of FIG. 7, the power-saving coefficient k is made smaller by the power-saving coefficient adjuster 66 of the control-unit CU (FIG. 3).

In the present embodiment, since the power-saving coefficient k is made smaller at constant rate, for example, 0.03/15 seconds, a driver of the vehicle does not feel the uncomfortable feelings. The rise of the battery temperature TB is also prevented as the battery temperature TB decreases.

In the present embodiment, additionally, the correction of the output command value CP by the power-saving coefficient k is carried out within the rather loose restriction range of the output current as shown in FIG. 4. In other words, the correction of the output command value CP is carried out within the region, in which the upper limit of the output limit value is not so high.

As can be seen from the power-saving map shown in FIG. 4, the determination of the output limit value is carried out within rather lose region. In other words, the determination is carried out within the region, in which the upper limit of the output limit value is not so small. Thereby, a driver (vehicles) can fully receive the assist by the motor 12.

This effectiveness is also obtained in the regenerative mode. Thus, a driver (vehicle) can utilize the regenerative braking while accepting the correction (restriction) of the output command value CP by the power-saving coefficient k.

In the present embodiment, the rise of the battery temperature TB is certainly prevented by correcting the output command value CP using the power-saving coefficient k. Thus, the life of the high-pressure battery 17 can be prolonged.

Next, the cruising condition changes to "high-speed cruising". In this mode, vehicle cruises only by the driving force given by the engine 11. Thus, the input-and-output of the electric current to the high-pressure battery 17 is not carried out.

In that occasion, since the exchanged current value average Iav decreases and becomes under the permissible current value Is, the requirement for performing the correction of the output command value CP by the power-saving coefficient k is not fulfilled. Thereby, the power-saving coefficient k returns to the initial state.

In that occasion, since the power-saving coefficient k becomes larger at constant rate, for example, 0.03/25 seconds, the uncomfortable feeling caused by the change of the output power will not given to a driver even if the throttle is operated.

The power-saving coefficient adjuster 66 of the control-unit CU (shown in FIG. 3) corresponds to the restriction reducer.

In the "high-speed cruising", the cooling of the high-pressure battery 17 is fully performed. Thereby, the battery temperature TB is dropped.

In the time chart, the cruising condition changes to "Continuous high-speed rapid acceleration/deceleration" before the battery temperature BT drops too much.

In this "Continuous high-speed rapid acceleration/deceleration", the charge and discharge of the high-pressure battery 17 is repeated as well as "Continuous up-and-down cruising". Thereby, the power-saving coefficient k is decreased as the high-pressure battery 17 arises. In that occasion, decreasing of the output command value CP is controlled by the control-unit CU.

In the present embodiment, the battery temperature Tb does not exceed the upper limit temperature, for example, 45 degree, because the power-saving coefficient k can further be decreased even if "Continuous high-speed rapid acceleration/deceleration" is further repeated.

Therefore, a driver (vehicles) accepts the suitable assist and the regenerative braking while receiving the restriction by the power-saving coefficient k because the rather lose region of the power-saving map (shown in FIG. 4) is used when the assist or regeneration by the motor 12 is performed.

Finally, the cruising condition changes to "urban cruising". In this "urban cruising", "continuous high-speed rapid acceleration/deceleration" is not performed. Thus, the power-saving coefficient k becomes large (returns to the initial state). Also, The real battery temperature TB drops gradually.

According to the drive unit 10 for the vehicle, the cruising of the vehicle can be achieved while keeping the battery temperature TB below the upper limit temperature irrespective of the cruising conditions. Thus, a driver (vehicle) can accept the sufficient assistance and the regenerative braking even if the output command value CP is restricted by the power-saving coefficient K.

Time Chart 2

Next, the operation of the drive unit 10 for vehicle will be explained with reference to the time chart of FIG. 8 (see FIG. 6 from FIG. 1 suitably).

Figure 8:
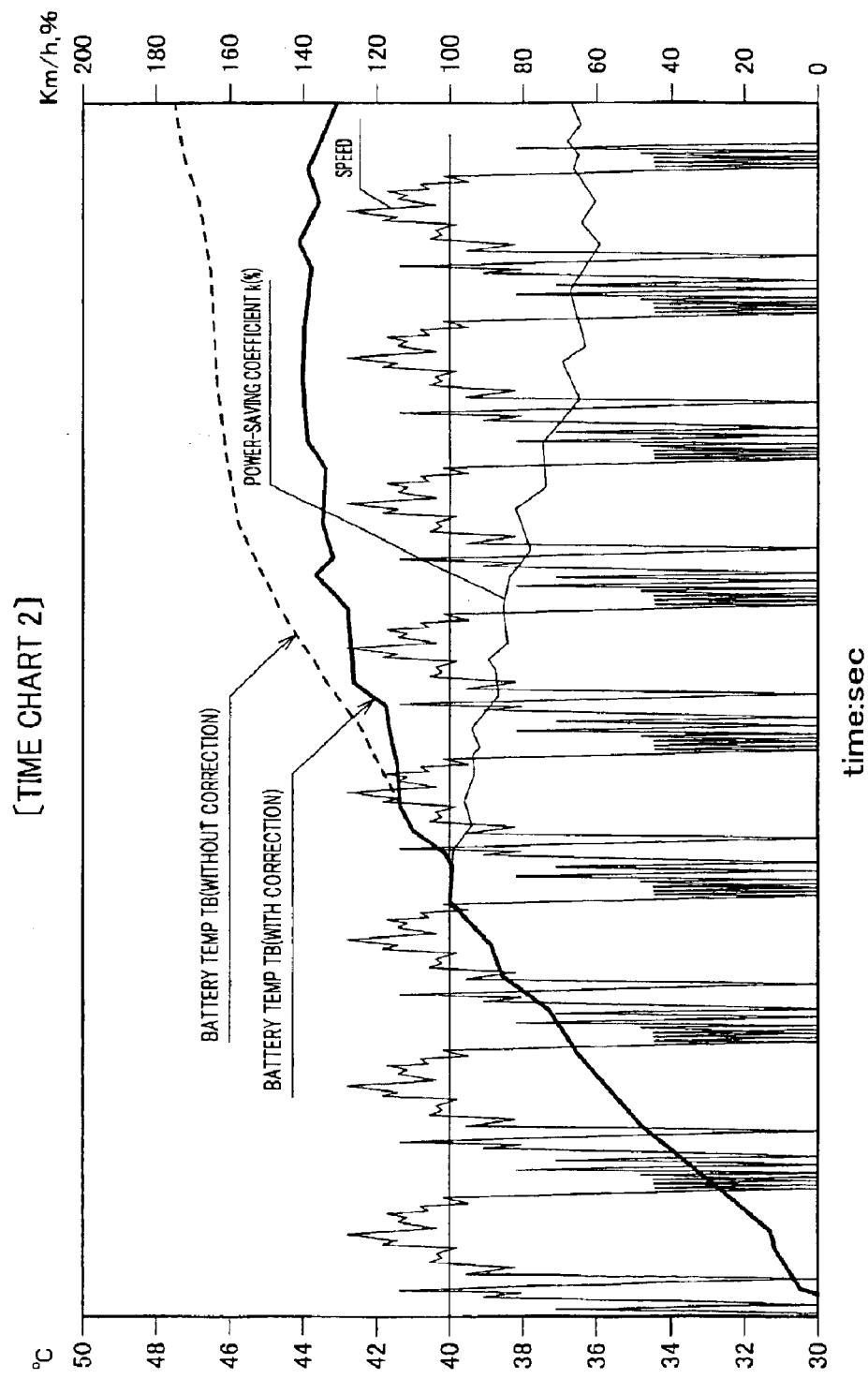
FIG. 8 is the time chart showing the battery temperature depending on whether or not the correction of the output command value by the power-saving coefficient is carried out.

FIG. 8 is the time chart showing the battery temperature depending on whether or not the correction of the output command value by the power-saving coefficient is carried out.

In this FIG. 8, the battery temperature Tb, the power-saving coefficient k, and speed of vehicle are shown together with the time, respectively.

The battery temperature TB indicated by the continuous line shows the case where the correction of the output command value by the power-saving coefficient k is carried out. The battery temperature TB indicated by the dashed line shows the case where the correction of the output command value is not carried out.

In the time chart shown in FIG. 8, the hybrid vehicle described above repeats the cruising of 100 or more km/h from 0 Km/h. The threshold temperature defined as 40 degree. The power-saving coefficient k, which was 100% at initial state, becomes gradually smaller at predetermined rate, e.g. 3% at each 15 seconds, after the battery temperature TB exceeds the 40-degree.

As can be seen from the time chart shown in FIG. 8, when the output command value is corrected by making the power-saving coefficient small, the rising rate of the battery temperature TB becomes gradually small, and then the rise of the temperature is stopped or the temperature is decreased. Thereby, the battery temperature TB is kept below the upper limit temperature, e.g. 45 degrees.

When the power-saving coefficient k is not made smaller, in other words, the correction of the output command value CP is not carried out, the battery temperature TB continuously arose as shown in the dashed line. Then, the battery temperature TB will exceed the upper limit temperature Ts2, e.g. 45 degree.

In the drive unit 10 for vehicle, accordingly, the life of the high-pressure battery 17 can be prolonged as compared to the conventional battery.

In the vehicle adopting the drive unit 10 of the present embodiment, since the battery temperature TB can be controlled in low as compared to the conventional, the rather lose restricted region of the power-saving map (shown in FIG. 4) can be used. In other words, since the battery temperature is kept at suitable low temperature for operating the high-pressure battery, the output limit value can be defined from the rather loose region of the power-saving map when assigning the output limit value. Thus, a driver (vehicles) can accept the suitable assist and regenerative braking.

Scramble Assistance

Figure 6:
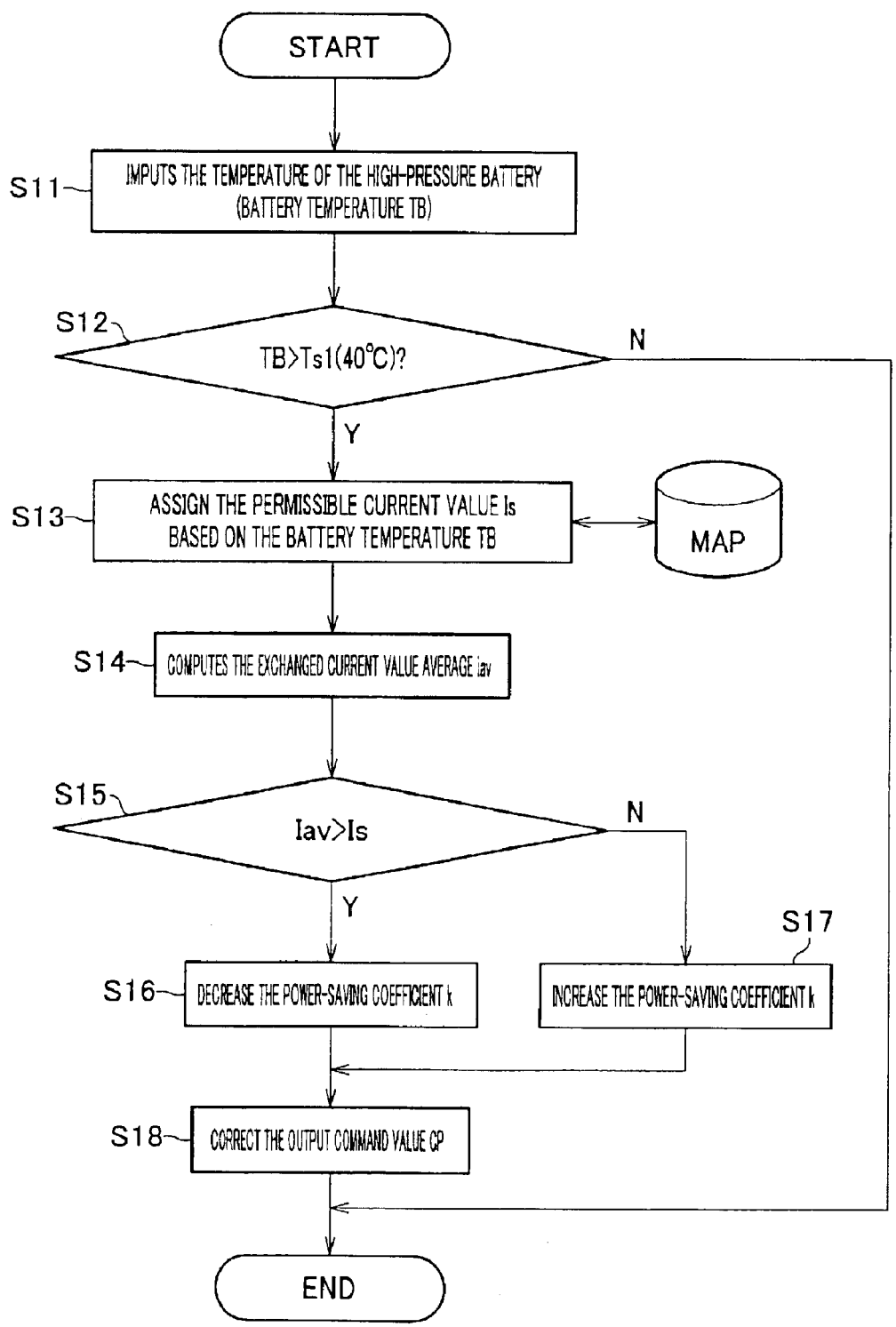
FIG. 6 is a flow chart of the control manner to be performed by a control-unit.

In the above described embodiment, as shown in the flow chart of FIG. 6, the correction of the output command value CP by the power-saving coefficient k is carried out only when the requirement of both the battery temperature TB>threshold value Ts1 and the movable current value Iav>permissible current value Is are fulfilled, in other words, both TB>Ts1 and Iav>Is are fulfilled.

In the present embodiment, however, it is preferable to initialize the corrected output command value CP when the sharp assist or the large regenerative braking is required. The necessity of the sharp assist arises, when a driver steps on the accelerator pedal with strong force, such as in case of rapid acceleration. The requirement of the large regenerative braking arises, when a driver steps on the brake pedal with strong force instantaneously, such as in case of rapid braking.

Figure 9:
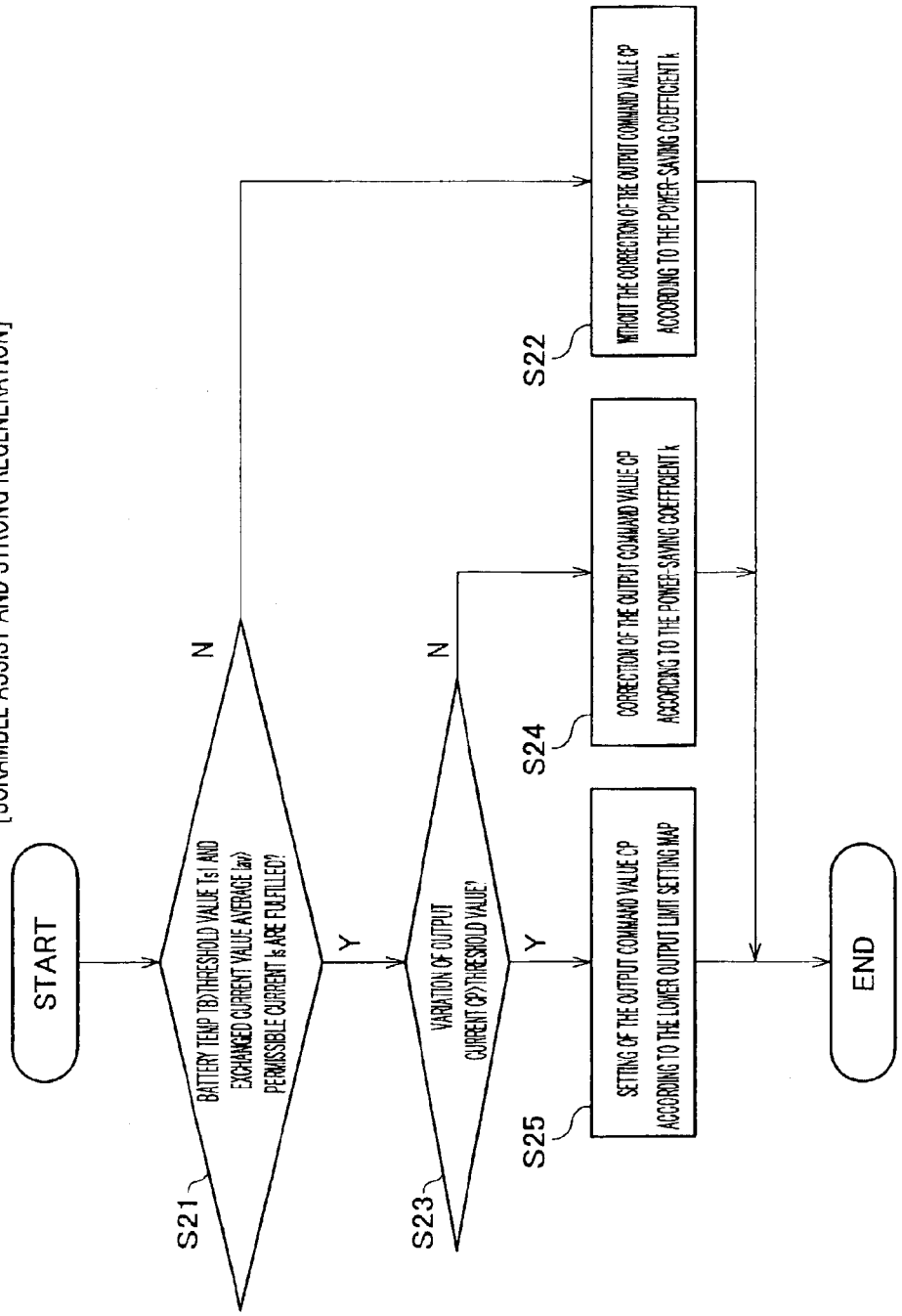
FIG. 9 is a flow chart for processing the scramble assist.

For this reason, when the sharp change of the output command value CP is arisen, the control-unit CU should be controlled along the flow chart shown in FIG. 9.

FIG. 9 is a control flow chart to be performed when scramble assistance or the strong regeneration is required.

Figure 10:
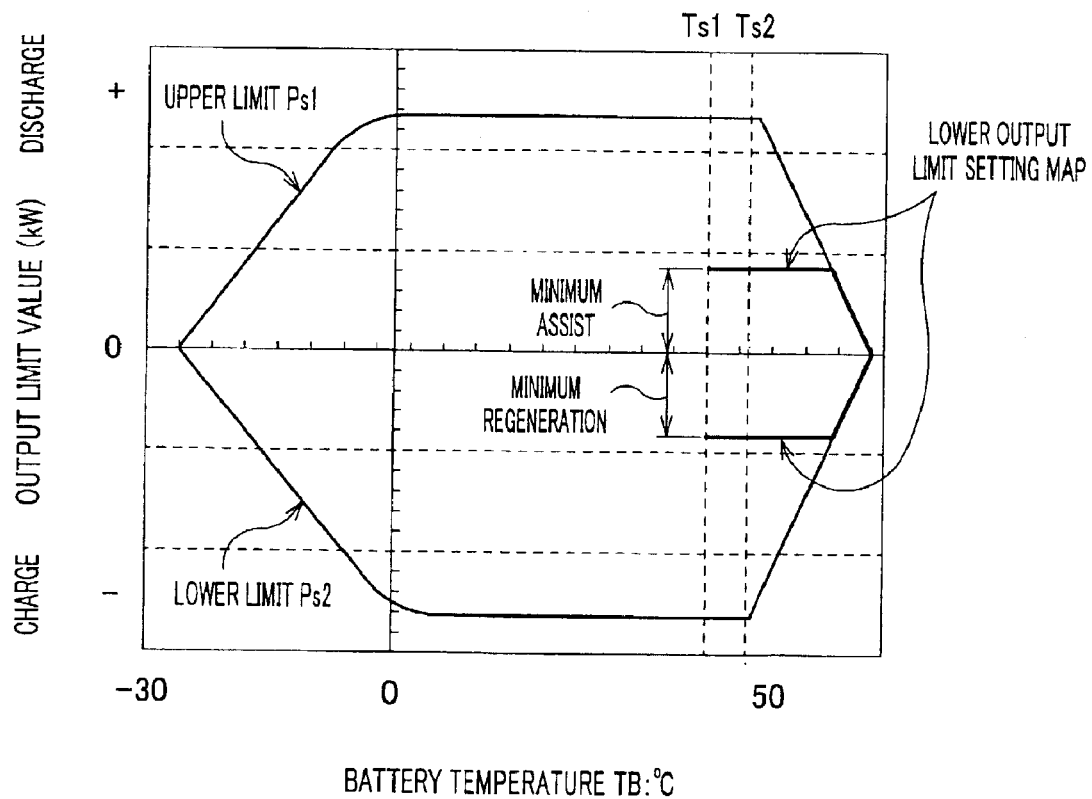
FIG. 10 is a map used at the time of scramble assist.
Figure 11:
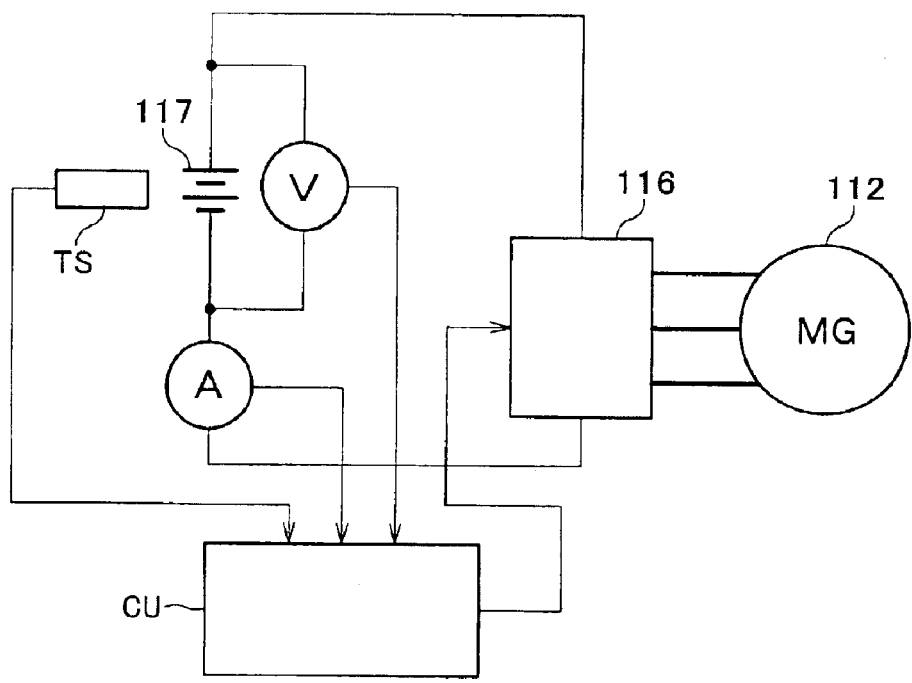
FIG. 11 is a block diagram showing the construction of the motor and the high-pressure battery of the conventional hybrid vehicle.
Figure 12:
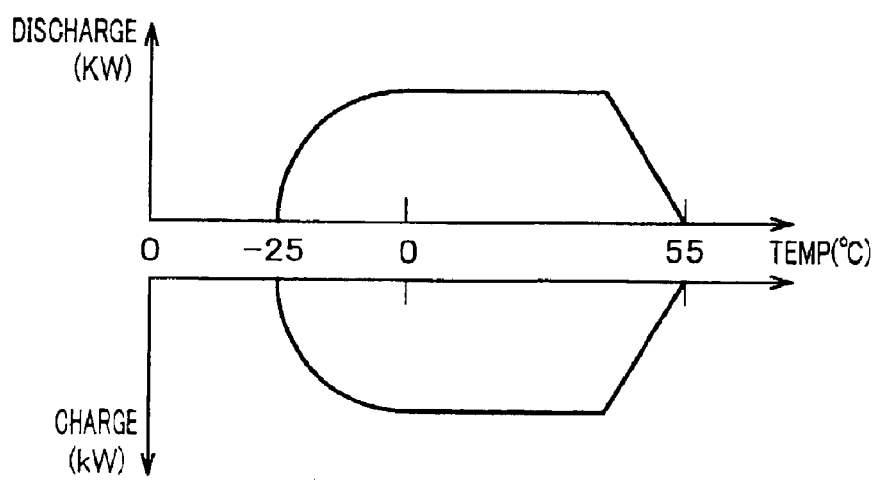
FIG. 12 is a power saving-map used by the control-unit shown in FIG. 11.

FIG. 10 is a map used for setting the minimum output when the scramble assist or the strong regeneration is required. The flow chart shown in FIG. 9 corresponds to flow chart, which explains the operation of the minimum torque command value generator.

The operation at the time of scramble assist will be carried out by referring to FIGS. 9 and 10.

First, checking whether or not the battery temperature TB exceeds the threshold temperature Ts1, TB>Ts1, and checking whether or not the exchanged current value average Iav exceeds the permissible current value Is, Iav>Is. To be more precise, checking whether or not the requirement for performing the correction of the output command value CP by the power-saving coefficient k is fulfilled.

The reason why this checking is carried out is because the scramble assistance is the exceptional case of the correction of the output command value CP.

When the requirement of Step S21 is not fulfilled, the processing skips to steps 22 because there is no need of scramble assist. Thus, the output command value CP without correction is outputted to the control-unit CU.

In Step S22, the multiplication between the output command value CP and the power-saving coefficient (k=1 [100%]) is carried out, and then the multiplied result is outputted to the inverter 16.

When the requirement of Step S21 is fulfilled, it is checked whether or not the output command value CP>the threshold value. In other words, checking whether or not the requirement for performing the scramble assist is fulfilled because the scramble assist is carried out for responding to the momentary change of the output command value CP.

The amount of change of the output command value CP is obtained from the difference between the output command value CP of present time and that of last time.

When the requirement of Step S23 is not fulfilled, to be more precise, when the change amount of the output command value CP is below the threshold value, since the scramble assist is not required, the processing steps to Step 24.

In step 24, the correction of the output command value CP by the power-saving coefficient k is carried out, and then corrected output command value CP is outputted to the inverter 16. Here, the output command is indicated as (=k×CP or =k×CP×1.1).

When the requirement of Step S23 is fulfilled, to be more precise, the change amount of the output command value CP exceed the threshold value, making the command value corrector 67 shown in FIG. 3 into the stopping condition. Then, the value, which is the output limit value obtained from the map (indicated by the bold line) of FIG. 10, is defined as the output command value CP.

Thereby, the output command value CP settled by the lower output limit setting map is outputted to the inverter 16 when the corrected output command value CP becomes small.

Accordingly, the motor 12 assists the engine 11 based on the output command value CP, which is defined based on the lower output limit setting Map. In other words, the motor 12 assists the engine 11 using the replaced output command value CP, which is defined based on the lower output limit setting Map when the corrected output compensation value CP is smaller than the lower limit in the Map.

This replacement is also carried out in the case of strong regeneration. Thus, the minimum-required regenerative braking can be given to a hybrid vehicle.

Another Setup Manner of Permissible Current Value

Another example of the setup manner of a permissible current value will be explained.

In the above-described embodiment, the permissible current value Is is assigned by referring to the Map shown in FIG. 5 based on the temperature difference. In this case, the temperature difference $\Delta T$ between the upper limit temperature Ts2 and the battery temperature TB imputed from permissible current value assigner 63 is used. The setting manner of the permissible current value Is is not restricted to this, the setting manner in which the permissible current value IS is obtained by computing based on the formula (1) and formula (2), which are indicated as below, may be acceptable.

The setting manner based on the formula (1) will be explained as below.

$$\text{Permissible current value}(Is) = \sqrt{\frac{(Ts2 - TB) \times CC}{IR}} \quad (1)$$

In this formula (1), the value detected by the battery temperature sensor T is used as the battery temperature TB. The cooling coefficient CC varies depending on the ambient conditions of the high-pressure battery 17, or the thermal characteristics of the high-pressure battery 17. The internal resistance IR is determined based on the characteristic of the high-pressure battery 17. The cooling coefficient CC and the internal resistance IR are predetermined value, respectively.

From this formula (1), how much current can be passed is calculated based on the upper limit temperature Ts2 of high-pressure battery 17, the cooling coefficient CC, the internal resistance IR, and the detected battery temperature TB. The obtained current value is the permissible current value (Is).

The accurate permissible current value can be computed according to Formula (1). The certain temperature control of the high-pressure battery 17 can thus be achieved.

Next, another computing manner of the permissible current value using Formula (2) will be explained.

$$\text{Permissible current value}(Is) = \sqrt{\frac{Ts2 + HtransC \times Ccapa(TB - TI)}{IR \times Ccapa}} \quad (2)$$

From this formula (2), the permissible current value Is is computed based on the upper limit temperature Ts2 of the high-pressure battery 17, the battery temperature TB, the measured temperature of the air streamed to the high-pressure battery 17 (ingressive temperature). In this formula (2), the permissible current value (Is) is computed based on the balance between heating and cooling. Here, each of the internal resistance IR, the heat-transmitting coefficient (HtransC), and the calorific capacity (Ccapa) are predetermined value. The ingressive temperature (TI) is detected value.

The accurate permissible current value can be computed from this formula (2).

The present invention can be represented by the various manners and is not restricted to the above-described embodiment.

The drive unit, for example, can be used for an electric vehicle driven by a motor in addition to a hybrid vehicle.

In the present embodiment, furthermore, the inverter is provided near the battery disposed at the rear side of the vehicle. The position of the inverter is not restricted to this position, another position, for example, near the motor, may be acceptable.

In the present embodiment, moreover, the timer, which limits the processing time of the scramble assistance, may be provided for preventing the excess rise of the battery temperature.

INDUSTRIAL APPLICABILITY

In the present invention, the current value, which account for the heat generation, is controlled based on the predetermined upper limit temperature of the battery. Thus, the temperature of the battery is prevented from exceeding the predetermined temperature. Thereby, the performance of the hybrid vehicle adopting the drive unit according to the present invention can fully be demonstrated irrespective of the battery temperature.

In the present invention, furthermore, the torque command value can be changed without causing the uncomfortable feelings to a driver.

In the present invention, still furthermore, the required torque of minimum value can be outputted even if the torque command value of high value is inputted while the torque command value is restricted to small. Thus, the assist of engine and the regenerative braking are achieved in the condition that the adverse affection to the drive or the braking is alleviated.

In the present invention, the computing of the permissible current value is certainly achieved.

What is claimed is:

1. A drive unit for a vehicle that utilizes a generator motor activated by an electric current supplied from a condenser to drive a vehicle and assists an internal combustion engine driving in a vehicle, said drive unit comprising:

a temperature detector which detects a temperature of said condenser;

a current value detector which detects the current value inputted to and outputted from said condenser;

a calculator which computes a permissible current value that can be inputted to and outputted from said condenser, based on a difference between a temperature of said condenser and a predetermined upper limit temperature when the temperature of said condenser exceeds a threshold temperature;

a current value determiner which determines whether said current value that is inputted to and outputted from said condenser exceeds said permissible current value; and a command value corrector which lessens a torque command value of said generator motor when said current value determiner determines that said current value inputted to and outputted from said condenser exceeds said permissible current value, wherein said command value corrector includes a coefficient multiplier, which multiply a coefficient by torque command value inputted to said generator motor in order to give a limit to said torque command value; and wherein said coefficient multiplier includes:

a restriction adder, which lessens said torque command value by making said coefficient gradually smaller by a predetermined value for every predetermined time when said current value inputted to and outputted from said condenser exceeds said permissible current value; and a restriction reducer, which makes said torque command value gradually larger by making said coefficient larger by predetermined value for every predetermined time when said current value inputted to and outputted from said condenser becomes equal to or below said permissible current value.

2. A drive unit for a vehicle that utilizes a generator motor activated by an electric current supplied from a condenser to drive a vehicle and assists an internal combustion engine driving in a vehicle, said drive unit comprising:

a temperature detector which detects a temperature of said condenser;

a current value detector which detects the current value inputted to and outputted from said condenser;

a calculator which computes a permissible current value that can be inputted to and outputted from said condenser, based on a difference between a temperature of said condenser and a predetermined upper limit temperature when the temperature of said condenser exceeds a threshold temperature;

a current value determiner which determines whether said current value that is inputted to and outputted from said condenser exceeds said permissible current value; and a command value corrector which lessens a torque command value of said generator motor when said current value determiner determines that said current value inputted to and outputted from said condenser exceeds said permissible current value, further comprising a minimum torque command value generator, which outputs a predetermined minimum torque command value and disables said command value corrector, if high torque value is instantaneously inputted as said torque command value when the temperature of said condenser exceeds said upper limit temperature.

3. A drive unit for a vehicle according to claim 1, further comprising a minimum torque command value generator, which outputs a predetermined minimum torque command value and disables said command value corrector, if high torque value is instantaneously inputted as said torque command value when the temperature of said condenser exceeds said upper limit temperature.

4. A drive unit for a vehicle that utilizes a generator motor activated by an electric current supplied from a condenser to drive a vehicle and assists an internal combustion engine driving in a vehicle, said drive unit comprising:

a temperature detector which detects a temperature of said condenser;

a current value detector which detects the current value inputted to and outputted from said condenser;

a calculator which computes a permissible current value that can be inputted to and outputted from said condenser, based on a difference between a temperature of said condenser and a predetermined upper limit temperature when the temperature of said condenser exceeds a threshold temperature;

a current value determiner which determines whether said current value that is inputted to and outputted from said condenser exceeds said permissible current value; and a command value corrector which lessens a torque command value of said generator motor when said current value determiner determines that said current value inputted to and outputted from said condenser exceeds said permissible current value, wherein said permissible current value is obtained from formula (1), when a temperature of said condenser exceeds said predetermined temperature: and $$\text{Permissible current value}(Is) = \sqrt{\frac{(UT - BT) \times CC}{IR}} \quad (1)$$

wherein UT is a upper limit temperature, BT is a condenser temperature, CC is a cooling coefficient, and IR is internal resistance.

5. A drive unit for vehicles according to claim 1, wherein said permissible current value is obtained from formula (1), when a temperature of said condenser exceeds said predetermined temperature: and $$\text{Permissible current value}(Is) = \sqrt{\frac{(UT - BT) \times CC}{IR}} \quad (1)$$

wherein UT is a upper limit temperature, BT is a condenser temperature, CC is a cooling coefficient, and IR is internal resistance.

6. A drive unit for vehicles according to claim 2, wherein said permissible current value is obtained from formula (1), when a temperature of said condenser exceeds said predetermined temperature: and $$\text{Permissible current value}(Is) = \sqrt{\frac{(UT - BT) \times CC}{IR}} \quad (1)$$

wherein UT is a upper limit temperature, BT is a condenser temperature, CC is a cooling coefficient, and IR is internal resistance.

7. A drive unit for vehicles according to claim 3, wherein said permissible current value is obtained from formula (1), when a temperature of said condenser exceeds said predetermined temperature: and $$\text{Permissible current value}(Is) = \sqrt{\frac{(UT - BT) \times CC}{IR}} \quad (1)$$

wherein UT is a upper limit temperature, BT is a condenser temperature, CC is a cooling coefficient, and IR is internal resistance.

8. A drive unit for a vehicle that utilizes a generator motor activated by an electric current supplied from a condenser to drive a vehicle and assists an internal combustion engine driving in a vehicle, said drive unit comprising:

a temperature detector which detects a temperature of said condenser;

a current value detector which detects the current value inputted to and outputted from said condenser;

a calculator which computes a permissible current value that can be inputted to and outputted from said condenser, based on a difference between a temperature of said condenser and a predetermined upper limit temperature when the temperature of said condenser exceeds a threshold temperature;

a current value determiner which determines whether said current value that is inputted to and outputted from said condenser exceeds said permissible current value; and a command value corrector which lessens a torque command value of said generator motor when said current value determiner determines that said current value inputted to and outputted from said condenser exceeds said permissible current value, wherein said permissible current value is obtained from formula (2), when a temperature of said condenser exceeds said predetermined temperature: and $$\text{Permissible current value}(Is) = \sqrt{\frac{UT + HC \times CC(TG - TI)}{IR \times CC}} \quad (2)$$

wherein UT is a upper limit temperature, HC is heat-transmitting coefficient, TG is generator temperature, TI is ingressive temperature, IR is internal resistance, and CC is calorific capacity.

9. A drive unit for vehicles according to claim 1, wherein said permissible current value is obtained from formula (2), when a temperature of said condenser exceeds said predetermined temperature: and $$\text{Permissible current value}(Is) = \sqrt{\frac{UT + HC \times CC(TG - TI)}{IR \times CC}} \quad (2)$$

wherein UT is a upper limit temperature, HC is heat-transmitting coefficient, TG is generator temperature, TI is ingressive temperature, IR is internal resistance, and CC is calorific capacity.

10. A drive unit for vehicles according to claim 2, wherein said permissible current value is obtained from formula (2), when a temperature of said condenser exceeds said predetermined temperature: and $$\text{Permissible current value}(Is) = \sqrt{\frac{UT + HC \times CC(TG - TI)}{IR \times CC}} \quad (2)$$

wherein UT is a upper limit temperature, HC is heat-transmitting coefficient, TG is generator temperature, TI is ingressive temperature, IR is internal resistance, and CC is calorific capacity.

11. A drive unit for vehicles according to claim 3, wherein said permissible current value is obtained from formula (2), when a temperature of said condenser exceeds said predetermined temperature: and $$\text{Permissible current value(Is)} = \sqrt{\frac{UT + HC \times CC(TG - TI)}{IR \times CC}} \quad (2)$$

wherein UT is a upper limit temperature, HC is heat-transmitting coefficient, TG is generator temperature, TI is ingressive temperature, IR is internal resistance, and CC is calorific capacity.

12. A controlling method of a drive unit for a vehicle that utilizes a generator motor activated by an electric current supplied from a condenser to drive a vehicle and assists an internal combustion engine driving in a vehicle, said controlling method comprising the steps of:

detecting a temperature of said condenser;

detecting the current value inputted to and outputted from said condenser;

computing a permissible current value that can be inputted to and outputted from said condenser, based on a difference between a temperature of said condenser and a predetermined upper limit temperature when the temperature of said condenser exceeds a threshold temperature;

determining whether said current value inputted to and outputted from said condenser exceeds said permissible current value; and lessening a torque command value of said generator motor when said current value determiner determines that said current value inputted to and outputted from said condenser exceeds said permissible current value, wherein said step of lessening a torque command value of said generator motor has a step of multiplying a coefficient by said torque command value inputted to said generator motor in order to give a limit to said torque command value, and wherein said step of multiplying a coefficient further comprising steps of:

lessening said torque command value by making said coefficient gradually smaller at predetermined value for every predetermined time when said current value inputted to and outputted from said condenser exceeds said permissible current value; and making said torque command value gradually larger by making said coefficient larger by predetermined value for every predetermined time when said current value inputted to and outputted from said condenser becomes equal to or below said permissible current value.

13. A controlling method of a drive unit for a vehicle that utilizes a generator motor activated by an electric current supplied from a condenser to drive a vehicle and assists an internal combustion engine driving in a vehicle, said controlling method comprising the steps of:

detecting a temperature of said condenser;

detecting the current value inputted to and outputted from said condenser;

computing a permissible current value that can be inputted to and outputted from said condenser, based on a difference between a temperature of said condenser and a predetermined upper limit temperature when the temperature of said condenser exceeds a threshold temperature;

determining whether said current value inputted to and outputted from said condenser exceeds said permissible current value;

lessening a torque command value of said generator motor when said current value determiner determines that said current value inputted to and outputted from said condenser exceeds said permissible current value; and outputting a predetermined minimum torque command value and disabling said command value corrector, if high torque value is instantaneously inputted as said torque command value when the temperature of said condenser exceeds said upper limit temperature.

14. A drive unit for a vehicle that utilizes a generator motor activated by an electric current supplied from a condenser to drive a vehicle and assists an internal combustion engine driving in a vehicle, said drive unit comprising:

a temperature detector which detects a temperature of said condenser;

a current value detector which detects the current value inputted to and outputted from said condenser;

a calculator which computes a permissible current value that can be inputted to and outputted from said condenser, based on a difference between a temperature of said condenser and a predetermined upper limit temperature when the temperature of said condenser exceeds a threshold temperature;

a current value determiner which determines whether said current value that is inputted to and outputted from said condenser exceeds said permissible current value; and a command value corrector which lessens a torque command value of said generator motor when said current value determiner determines that said current value inputted to and outputted from said condenser exceeds said permissible current value, and the torque command value of the generator motor at the time of charging is higher than the torque command value of the generator motor at the time of discharging.

* * * * *